R. B. MICHALEK.
CINEMATOGRAPH.
APPLICATION FILED MAR. 31, 1920.
1,370,829.
Patented Mar. 8, 1921.
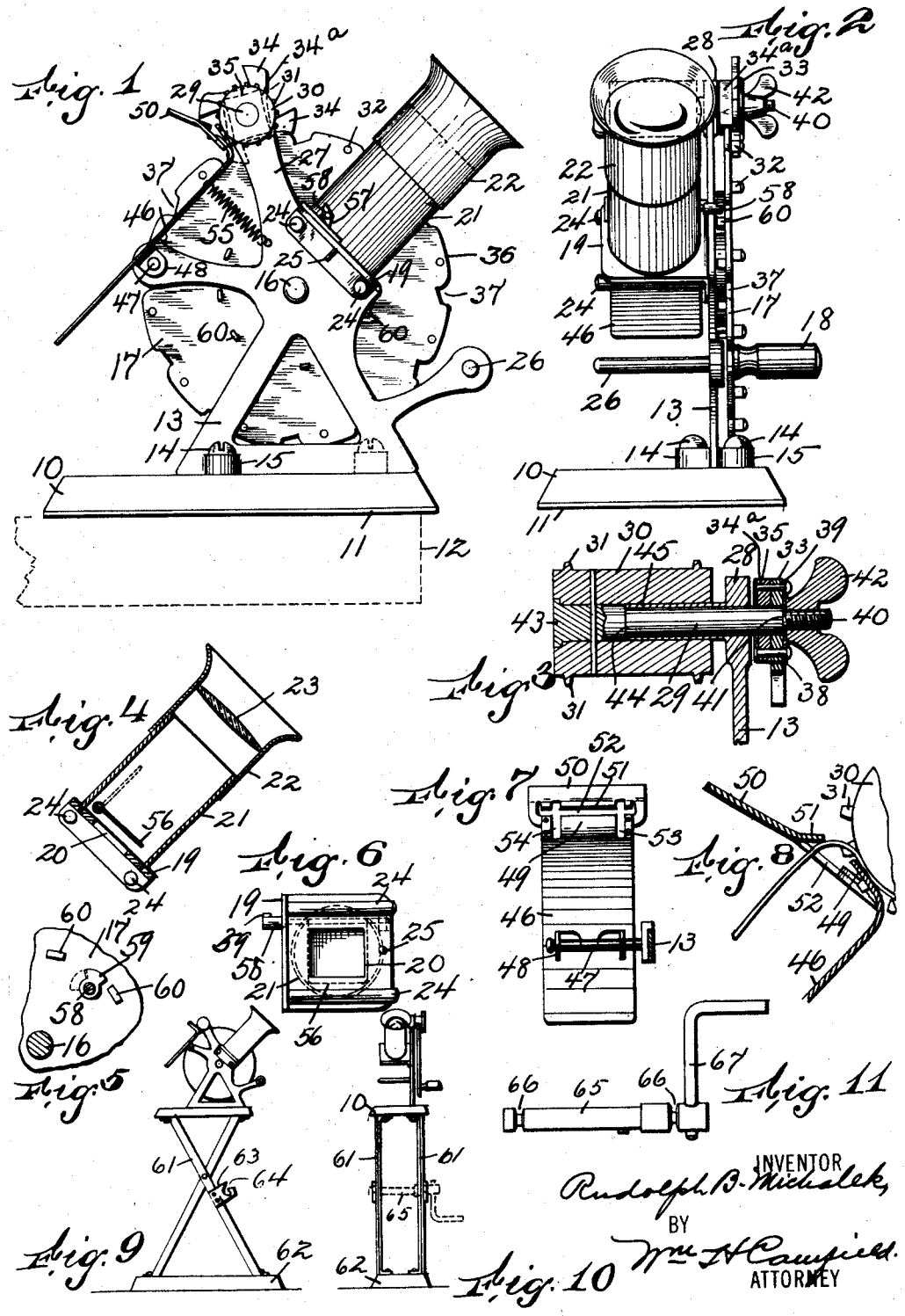

UNITED STATES PATENT OFFICE.

RUDOLPH B. MICHALEK, OF NEWARK, NEW JERSEY.

CINEMATOGRAPH.

1,370,829.   Specification of Letters Patent.   Patented Mar. 8, 1921.

Application filed March 31, 1920. Serial No. 370,156.

*To all whom it may concern:*

Be it known that I, RUDOLPH B. MICHALEK, a citizen of the United States, and a resident of Newark, county of Essex, and State of New Jersey, have invented certain new and useful Improvements in Cinematographs, of which the following is a specification.

This invention relates to an improved cinematograph which is particularly adapted for use as a toy machine and is constructed so that a film can be passed through a frame at the end of an eye piece with a step-by-step movement, and the movement of the film is concealed by a shutter, the machine being compact and having but few parts so that it can be economically manufactured, and is furthermore designed to provide a structure in which the film can be easily inserted.

The invention is further designed to provide a machine of this kind in which a relatively large operating wheel, when rotated, actuates the film feeding device, so that the step-by-step movement by means of which the film is moved is operated from the wheel, and the shutter device, when installed, is also operated from the same wheel, thus reducing the number of parts.

The invention is further designed to provide a presser plate which holds the film against the sprocket that feeds it, also guides the film after it leaves the sprocket and can be swung from the sprocket to give a clear space for the insertion or removal of the film, the film being adapted to be removed from the sprocket and also from the guiding means in the frame transversely.

The invention is further designed to provide a device of this kind in which the sprocket can be released from its operating mechanism and also again connected up therewith by a very simple connection, so that when it is necessary to "frame" the film in the frame of the machine, that is, get the picture in alinement with the opening in the frame of the machine, the sprocket is free to be rotated at will, and when "framed", the film is held in position while the sprocket is against connected up with the step-by-step operating means, and in this way no time is lost in getting the film in position for its successful operation.

The whole structure is put together with the idea of having a substantially vertical support, closely adjacent to which is the eye piece, and the shutter operating mechanism and the film feeding device are both operated preferably from the same operating wheel, which is turned by a handle attached thereto, so that the machine is not necessarily any wider than the space necessary for the eye piece and the projecting handle.

The invention further relates to several details of construction that will be more fully described hereinafter and finally embodied in the claims.

The invention is illustrated in the accompanying drawing, in which Figure 1 is a side view of the machine. Fig. 2 is a front view thereof. Fig. 3 is a section through the film-feeding sprocket, showing the manner of connecting and disconnecting to and from the operating means. Fig. 4 is a vertical section through the eye piece and the frame. Fig. 5 is an enlarged detail showing the means for operating the shutter in the eye piece. Fig. 6 is a bottom view of the eye piece and the frame shown in Fig. 4. Fig. 7 is a front view of the presser plate. Fig. 8 is an enlarged detail showing the upper end of the presser plate and illustrating how it guides the film after the film leaves the sprocket. Fig. 9 is a reduced view showing a preferred form of stand on which the machine is mounted. Fig. 10 is a front view of the device shown in Fig. 9, and Fig. 11 is an enlarged view of a rewinding handle to be used in conjunction with the frame shown in Figs. 9 and 10.

I preferably mount the machine on a suitable base 10, which usually has a strip of felt or other soft material 11 on the bottom of it so that it can be moved about on a table or similar support 12, and on the base 10 I arrange a support 13, which is usually made of cast metal and suitably secured to the base, the form shown comprising screws 14 passing through lugs 15 on the bottom part of the support. The central part of the support forms a hub through which the shaft or axle 16 of the operating wheel 17 projects, the wheel 17 being of comparatively large diameter, being operated by a suitable handle 18.

Adjacent to the hub I secure the frame 19, which has an opening 20 therein, through which opening the film is viewed through the eye piece 21, which is composed of two parts, the outer part 22 being slidable or telescopic with the inner tube, the outer tube having a lens 23 therein, the lens thus being movable to permit adjustment to the eye of an observer, so that a picture is in focus.

Closely adjacent to the bottom face of the frame 19 are the studs 24 directly above and below the opening in the frame, these studs being designated as horizontal studs, and a vertical pin 25 coöperates with the studs so that a film that is fed through between the studs and the bottom face of the frame is held against lateral movement by the pin on one side and the support of the frame on the other side.

For supporting the roll of film I provide a shaft 26, onto which the roll of film is slid, and then it is placed on the under side of the frame by passing it over the outer ends of the studs 24, the ends of which project slightly beyond the outer edge of the frame 19, and then by looping it down in the center to pass it underneath the pin 25, it can be pushed in so that the film is fed with its picture portion directly in line with the opening 20 of the frame.

On the arm 27 is arranged a bearing 28 which supports the axle 29 of the sprocket 30, the sprocket 30 having teeth 31 that engage the small openings formed in films on either side of the picture and by means of which the film is fed. The sprocket is given a step-by-step movement by the pins 32, which project from the outer face of the operating wheel 17 and engage a toothed wheel 33, the teeth 34 of which are successively engaged by the pins 32. The locking wheel 34ª, has the concave edges 35 which bear against the periphery 36 of the operating wheel 17, so that when the toothed wheel is not being engaged by a pin, the locking wheel is holding the sprocket against movement, the operating wheel having recesses 37 disposed so that when the toothed wheel 33 is engaged by a pin 32, and it is turned, the corners of the locking wheel have enough clearance so that the locking wheel can rotate.

The locking wheel 34ª and the toothed wheel 33 are preferably fastened together, one form shown in Fig. 3 illustrating the rivets 38, the outer face of the toothed wheel having secured thereto, by this means, a plate 39 which fits over the reduced end 40 of the axle 29 and bears against the shoulder 41 of the axle and is locked thereon by a suitable wing nut 42, the axle 29 having an enlarged end 43 which forms a shoulder 44, which shoulder bears against the sleeve 45 of the bearing 28 so as to limit the inward movement of the axle 29. This forms a quick and handy means for connecting and disconnecting the sprocket to and from its operating mechanism, since the locking wheel and the toothed wheel rotate with the axle of the sprocket only when they are locked together by the wing nut 42 being screwed up tight to force the disk or plate 39 against the shoulder 41.

A presser plate 46 is arranged so that it can swing, the form shown comprising a pivotal pin 47, on which the ears 48 are placed, these ears usually being struck up from the presser plate 46 which is preferably made of sheet metal and has a presser lip 49 at the top end thereof, which presser lip is narrower than the distance between the two rows of sprockets and thus bears against the smooth face of the sprocket, the presser plate having secured to its top end a finger piece 50 which is provided on its bottom edge with a guiding lip 51 that is bent up so as to provide a space 52 between the presser lip 49 and the guiding lip 51 to direct the film down along the presser plate after the film leaves the sprocket.

Slots 53 are placed so that they permit a free rotation of the teeth of the sprocket through the presser plate without interfering with the presser plate. A yielding means such as a spring 55 holds the presser plate so that the presser lip always bears against the sprocket, and the finger piece 50 can be grasped to swing the presser plate against the influence of the spring 55 so as to leave a considerable space between the sprocket and the presser plate to permit the insertion and removal of the film.

A shutter 56 is arranged within the eye piece 21 and normally hangs so that it closes the opening 20, so that the film can not be seen when the shutter is shut, the shutter being raised to the dotted position shown in Fig. 4 when the film is not moving, the shaft of the shutter, which rocks, being limited in its movement by the stop 57, the shaft 58 projecting with its inner end adjacent to the operating wheel 17 and having a gear 59 thereon, this being shown more particularly in Fig. 5, and the fingers 60 on the inner face of the operating wheel 17 successively engage the gear so as to swing the shutter to open position, and when being passed beyond the gear the shutter drops back to closed position. These fingers are disposed so that the shutter is open when the film is at rest and drops to its closed position when the film moves.

It will be evident that a film placed on the pins 26 is then placed over the studs 24 and behind the pins 25, the presser plate is swung back and the film has its forward end fed through the opening 52 in the presser plate, and then the presser plate is released and it swings back into position and the film is then ready for the operation of the machine, and by turning the handle 18 the above described mechanisms coöperate to give a clear and satisfactory exhibition of the film that passes across the opening 20 of the frame. If the picture is not properly "framed" when it is placed into the machine, by giving one-quarter turn to the left of the wing nut 42, the sprocket 30 is free to be revolved to "frame" the picture. When the film is in proper position the wing nut 42 is screwed up tightly and the machine can then be operated.

If desired, the base of the machine can be mounted on a frame formed by the crossed supporting strips 61, which have their bottom ends fastened to the pedestal 62, and at their top ends are secured to and support the base 10. Each of the forwardly inclined lower portions of the crossed strips 61 are provided with a bracket 63 which has a slot 64 to receive the shaft 65, which has annular grooves 66 so as to prevent transverse movement of the shaft 65, the shaft also having a handle 67, this shaft being insertible, as shown in dotted outline in Fig. 10, to provide means for rewinding a film as it comes, or after it comes, from the machine.

It will be evident that minor changes can be made in the details of construction and also in the arrangement of the parts without departing from the scope of my invention.

I claim:

1. A cinematograph comprising a substantially flat support, a wheel rotatable on the support, a film sprocket, an axle on which the film sprocket is secured, the axle being rotatable in the support, the axle having a shoulder thereon, a wheel in engagement with the operating wheel and having a flange to engage the shoulder, and a nut to regulate the contact of the shoulder and the flange.

2. A cinematograph comprising a substantially flat support, a wheel rotatable on the support, a film sprocket, an axle on which the film sprocket is secured, the axle being rotatable in the support, the axle having a shoulder thereon, a toothed wheel on the axle and operable from the operating wheel, a flange secured on the toothed wheel and adapted to bear against the shoulder, and a nut on the axle for forcing the flange against the shoulder to insure their simultaneous rotation.

3. A cinematograph comprising a thin vertical frame, an operating wheel mounted on one side thereof and parallel therewith, an eye tube mounted on the frame on the side opposite the operating wheel, a sprocket adapted to propel a film, means connected to the sprocket and coöperating with the operating wheel to perform a step-by-step movement, and means for yieldingly holding the film in contact with the sprocket.

4. A cinematograph comprising a thin vertical frame, an operating wheel mounted on one side thereof and parallel therewith, an eye tube mounted on the frame on the side opposite the operating wheel, a sprocket adapted to propel a film, means connected to the sprocket and coöperating with the operating wheel to perform a step-by-step movement, a pivoted presser plate having its end adapted to bear against the sprocket, and a spring bearing on the presser plate to yieldingly hold it in contact with said sprocket.

5. A cinematograph comprising an eye piece, means for conducting a film across the eye piece, said means including a sprocket, a pivoted presser plate having a presser lip on its upper end and disposed so as to bear against the sprocket between the rows of teeth of the sprocket, a finger piece on the end of the presser plate and having a guiding lip projecting at an angle to the presser lip and spaced therefrom so as to form an opening for guiding the film after it leaves the sprocket, the guiding lip and the presser lip having slots to permit free rotation of the teeth of the sprocket, and a spring for yieldingly holding the presser plate against the sprocket.

6. In a cinematograph, a frame having an eye piece mounted thereon, studs below the frame and arranged above and below the opening in the frame and being substantially parallel thereto, and a finger projecting from the frame between said studs and disposed so as to guide the outer edge of the film passing between the studs and the frame.

In testimony that I claim the foregoing, I have hereto set my hand, this 30th day of March, 1920.

RUDOLPH B. MICHALEK.